Patented Mar. 3, 1925.

1,528,291

UNITED STATES PATENT OFFICE.

HENRY DREYFUS, OF LONDON, ENGLAND.

MANUFACTURE OF PLASTIC MATERIALS OR ARTICLES HAVING A BASIS OF CELLULOSE ACETATE.

No Drawing. Application filed October 13, 1921. Serial No. 507,576.

*To all whom it may concern:*

Be it known that I, HENRY DREYFUS, a citizen of the Swiss Republic, of London, England, have invented certain new and useful Improvements Relating to the Manufacture of Plastic Materials or Articles Having a Basis of Cellulose Acetate, of which the following is a specification.

This invention relates to the manufacture of plastic materials or articles having a basis of cellulose acetate as for example celluloid-like materials, sheet, slabs, blocks, rods, tubes, rings, electric insulating parts and many other articles.

In the manufacture of such materials or products according to the usual methods, the cellulose acetate, with or without pigments or other additions, is incorporated with volatile solvents and with plasticising or softening agents. Thus, after the plastic materials or articles have been manufactured, for example by working up the ingredients in kneading or mixing machines, then on the rollers and finally in the presses and sheet cutters or in extrusion dies, moulds and so forth, they contain quantities of low boiling solvents and require to be "seasoned" in order to dry out the low boiling solvents. The thicker the sheets, rods, tubes or other articles the longer is the period of seasoning required, so that this may range from a few days in the case of thin sheets cut from pressed blocks, up to several months for thick sheets, tubes, rods and moulded articles.

The present invention aims to dispense with the period of seasoning.

With this object, according to the invention, the cellulose acetate, preferably in an air dried state, or heat dried state, is mixed or kneaded under heat with the plasticising or softening agent or agents, (hereinafter in the claims included in the term plasticising agent) in absence of volatile solvents and of diluents capable of being driven off by the heat (hereinafter referred to as volatile solvents and diluents), the cellulose acetate melting together with the plasticising or softening agent or agents to a plastic or liquid state under the heat. The mixing and heating may be performed in a vacuum if desired.

The heating may be applied during a portion or the whole of the mixing or kneading operation, the mass being heated to a much higher temperature than that of 50°–70° C. which is usual in the manufacture of ordinary nitrocellulose celluloid; for example one may heat to 90°–150° C. or even higher.

Pigments, filling substances or other usual or suitable additions may of course be incorporated. Likewise there may be incorporated with the mass in the mixing or kneading apparatus any known agents for neutralizing traces of acid, such for example as urea, mono-, di- or tri-methyl urea or mono-, di- or tri-ethyl urea.

The plasticising or softening agents may be employed in the amounts generally used, or in any desired quantity, according to requirements.

The material removed from the mixing or kneading apparatus may be further worked up on heated rollers in the known way, or it may be taken direct to the presses for pressing into blocks suitable for cutting into sheets, or to moulds for moulding or extrusion, or be otherwise worked up into moulded, extruded or other articles as desired.

The plastic mass from the kneading or mixing apparatus, after having been worked up on the rollers or not, may be taken to presses or moulds, for example block presses of the usual nature, or moulds of any suitable kind and heated up therein under pressure to a much higher temperature than is usually employed for pressing or moulding ordinary celluloid, for example to about 90°–150° C. or higher, so that the cellulose acetate is melted down in the plasticising or softening agents to form a plastic or more or less fluid mass which solidifies again on cooling.

Or pressure may be dispensed with and the mass from the kneaders or mixers or from the rollers may be simply melted, and cast or run, and allowed to set by cooling.

Blocks or slabs pressed, moulded or cast as before mentioned may be cut into sheets while the mass is still hot or after cooling.

Or the melted masses may be run on to surfaces to form sheets, films or the like, or extruded through dies to form rods, tubes or other articles.

The following is one example showing how the invention may be carried out, it being understood that this is given only by way of illustration and can be varied widely without departing from the spirit of the invention.

*Example.*

100 parts of finely ground cellulose acetate are worked up in a kneading apparatus with about 30 to 40 parts of mixed isomeric xylene-o-monomethyl sulphonamides (U. S. Patent No. 1,353,384), with or without addition of about 6 to 8 parts of triphenylphosphate or tricresylphosphate, the mass being gradually heated to about 100°-150° or higher during the kneading operation, or during the latter portion thereof, to melt the cellulose acetate together with the plasticising material. A vacuum may be applied during the heating if desired.

Pigments or dyes or other additions may be incorporated with the materials in the example according to requirement.

The masses removed from the kneading apparatus, and preferably whilst still hot, so as to avoid requirement for heating up again, may be worked up on heated rollers in a way similar to that practised in the celluloid manufacture, the rollers being however heated to higher temperatures than those usual in the celluloid manufacture, e. g. to 90°–100° C. or higher. Or, with or without working on rollers, the masses may be pressed into blocks or be otherwise moulded, extruded, run or cast as hereinbefore indicated, according to requirement and the character of the goods to be produced.

In particular the masses, preferably while still hot from the kneaders or rollers, may be moulded under heat and pressure in block presses or in any moulds suitable for the desired shape of product, at temperatures at which the cellulose acetate melts or remains melted in the plastifiers or softeners to a plastic or more or less fluid mass, for example at about 90°–150° C. or higher, the resulting blocks or moulded articles solidifying on cooling in the presses or moulds or otherwise, or they may be cut while still hot as before mentioned. Or the masses may be cast or run in a melted state into moulds to form moulded articles, or on to surfaces to form sheets, films or the like, or be extruded in a melted or hot state through dies to form rods, tubes or other articles.

Any known or suitable plasticising or softening agents may be employed in carrying out the invention, and any other suitable additions according to requirements may be made in incorporating the masses, such for example as filling substances, dyes, pigments, acid neutralizing agents and so forth. When material such as filling substances are employed in large proportions it is preferable to incorporate these in the mass when it is in a melted state.

By means of the invention articles and objects of any section, contour and thickness may be produced, whether solid or hollow, for example sheets, slabs, blocks, rods, tubes, rings, electric insulating parts or any other articles such as are commonly produced in celluloid, vulcanite, ebonite and so forth. They may be made transparent, opaque, plain or colored, and with any desired pattern or mottling, such for instance as imitation tortoiseshell and so forth, according as suitable additions are employed in the masses or not.

By means of the invention seasoning of the articles or objects can be dispensed with, and the articles are much less combustible and stronger than ordinary cellulose acetate celluloids made in the usual way with volatile solvents.

What I claim and desire to secure by Letters Patent is:

1. Process for the manufacture of plastic materials and articles having a basis of cellulose acetate, comprising incorporating together in absence of volatile solvents and diluents the constituents of a mixture comprising cellulose acetate and placticising agent, and melting the cellulose acetate together with the plasticising agent in the mixture by heating to above about 90° C. during at least a portion of the incorporating operation.

2. Process for the manufacture of plastic materials and articles having a basis of cellulose acetate, comprising incorporating together in absence of volatile solvents and diluents the constituents of a mixture comprising cellulose acetate and plasticising agent, and melting the cellulose acetate together with the plasticising agent in the mixture by heating to not less than about 100° C. during at least a portion of the incorporating operation.

3. Process for the manufacture of plastic materials and articles having a basis of cellulose acetate, comprising incorporating together, in absence of volatile solvents and diluents the constituents of a mixture comprising cellulose acetate and plasticising agent, and melting the cellulose acetate together with the plasticising agent in the mixture by heating to between about 100° and 150° C. during at least a portion of the incorporating operation.

4. Process for the manufacture of plastic materials and articles having a basis of cellulose acetate comprising incorporating together in absence of volatile solvents and diluents the constituents of a mixture comprising about 30 to 48 parts of plasticising agent and 100 parts of cellulose acetate in absence of volatile solvents and diluents, and melting the cellulose acetate together with the plasticising agent in the mixture by heating to temperatures not less than about 100° C. during at least a portion of the incorporating operation.

5. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating during at least a portion of the incorporating operation at not less than about 100° C. and working up the mass to a desired form under heat.

6. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating during at least a portion of the incorporating operation, and moulding the mass under pressure at temperatures above 90° C.

7. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating during at least a portion of the incorporating operation, working up the mass by hot rolling at temperatures above 90° C. and subsequently moulding under pressure at temperatures above 90° C.

8. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating at not less than about 100° C. during at least a portion of the incorporating operation, and moulding the mass under pressure at a temperature of at least 100° C.

9. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating at not less than about 100° C. during at least a portion of the incorporating operation, working up the mass by hot rolling at a temperature of at least 100° C., and moulding under pressure at a temperature of at least 100° C.

10. Process for the manufacture of plastic materials and articles having a basis of cellulose acetate, comprising incorporating together in absence of volatile solvents and diluents the constituents of a mixture comprising cellulose acetate and an amount of plasticising agent not greater than 50 per cent of the weight of the cellulose acetate, and melting the cellulose acetate together with the plasticising agent in the mixture by heating at not less than about 100° C. during at least a portion of the incorporating operation.

11. Process for the manufacture of plastic materials and articles having a basis of cellulose acetate, comprising incorporating together in absence of volatile solvents and diluents the constituents of a mixture comprising cellulose acetate and an amount of plasticising agent not greater than 50 per cent of the weight of the cellulose acetate, and melting the cellulose acetate together with the plasticising agent in the mixture by heating at not less than about 100° C. during at least a portion of the incorporating operation, and working up the mass to desired form under heat.

12. Process for the manufacture of plastic materials and articles having a basis of cellulose acetate, comprising incorporating together in absence of volatile solvents and diluents the constituents of a mixture comprising cellulose acetate and an amount of plasticising agent not greater than 50 per cent of the weight of the cellulose acetate, and melting the cellulose acetate together with the plasticising agent in the mixture by heating at not less than about 100° C. during at least a portion of the incorporating operation, and moulding the mass under heat and pressure.

In testimony whereof I have hereunto subscribed my name.

WILLIAM MILLER SAUNDERS.

5. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating during at least a portion of the incorporating operation at not less than about 100° C. and working up the mass to a desired form under heat.

6. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating during at least a portion of the incorporating operation, and moulding the mass under pressure at temperatures above 90° C.

7. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating during at least a portion of the incorporating operation, working up the mass by hot rolling at temperatures above 90° C. and subsequently moulding under pressure at temperatures above 90° C.

8. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating at not less than about 100° C. during at least a portion of the incorporating operation, and moulding the mass under pressure at a temperature of at least 100° C.

9. Process for the manufacture of plastic materials and articles having a basis of cellulose acetate, comprising incorporating together in absence of volatile solvents and diluents the constituents of a mixture comprising cellulose acetate and plasticising agent, melting the cellulose acetate together with the plasticising agent in the mixture by heating at not less than about 100° C. during at least a portion of the incorporating operation, working up the mass by hot rolling at a temperature of at least 100° C., and moulding under pressure at a temperature of at least 100° C.

10. Process for the manufacture of plastic materials and articles having a basis of cellulose acetate, comprising incorporating together in absence of volatile solvents and diluents the constituents of a mixture comprising cellulose acetate and an amount of plasticising agent not greater than 50 per cent of the weight of the cellulose acetate, and melting the cellulose acetate together with the plasticising agent in the mixture by heating at not less than about 100° C. during at least a portion of the incorporating operation.

11. Process for the manufacture of plastic materials and articles having a basis of cellulose acetate, comprising incorporating together in absence of volatile solvents and diluents the constituents of a mixture comprising cellulose acetate and an amount of plasticising agent not greater than 50 per cent of the weight of the cellulose acetate, and melting the cellulose acetate together with the plasticising agent in the mixture by heating at not less than about 100° C. during at least a portion of the incorporating operation, and working up the mass to desired form under heat.

12. Process for the manufacture of plastic materials and articles having a basis of cellulose acetate, comprising incorporating together in absence of volatile solvents and diluents the constituents of a mixture comprising cellulose acetate and an amount of plasticising agent not greater than 50 per cent of the weight of the cellulose acetate, and melting the cellulose acetate together with the plasticising agent in the mixture by heating at not less than about 100° C. during at least a portion of the incorporating operation, and moulding the mass under heat and pressure.

In testimony whereof I have hereunto subscribed my name.

WILLIAM MILLER SAUNDERS.

Certificate of Correction.

It is hereby certified that in Letters Patent No. 1,528,291, granted March 3, 1925, upon the application of Henry Dreyfus, of London, England, for an improvement in "The Manufacture of Plastic Materials or Articles Having a Basis of Cellulose Acetate," an error appears in the printed specification requiring correction as follows: Page 3, end of specification, signature of applicant, for "William Miller Saunders" read *Henry Dreyfus;* and that the said Letters Patent should be read with this correction therein that the same may conform to the record of the case in the Patent Office.

Signed and sealed this 31st day of March, A. D. 1925.

[SEAL.]
KARL FENNING,
*Acting Commissioner of Patents.*

Certificate of Correction.

It is hereby certified that in Letters Patent No. 1,528,291, granted March 3, 1925, upon the application of Henry Dreyfus, of London, England, for an improvement in "The Manufacture of Plastic Materials or Articles Having a Basis of Cellulose Acetate," an error appears in the printed specification requiring correction as follows: Page 3, end of specification, signature of applicant, for "William Miller Saunders" read *Henry Dreyfus;* and that the said Letters Patent should be read with this correction therein that the same may conform to the record of the case in the Patent Office.

Signed and sealed this 31st day of March, A. D. 1925.

[SEAL.]
KARL FENNING,
*Acting Commissioner of Patents.*